Dec. 15, 1959     A. V. MANDEKIC     2,917,323
TRAILER HITCH
Filed May 20, 1955     2 Sheets-Sheet 1
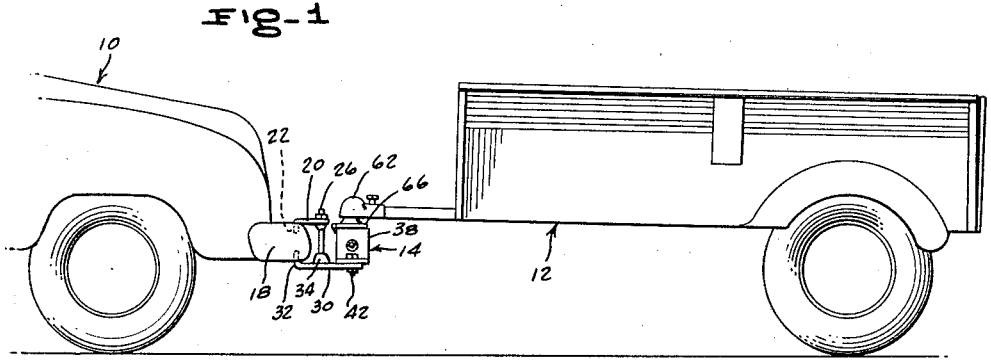
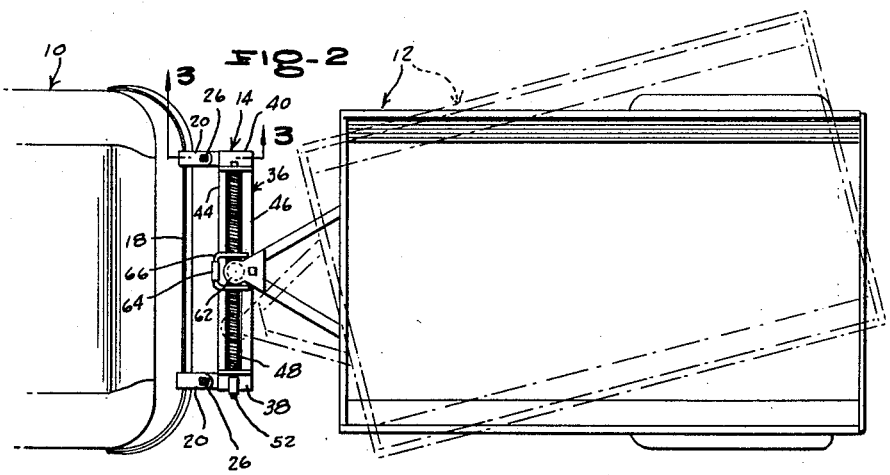
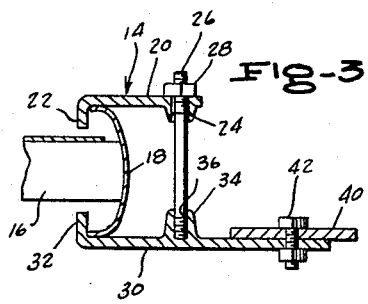
INVENTOR.
ANTHONY V. MANDEKIC
BY
McMorrow, Berman & Davidson
ATTORNEYS Dec. 15, 1959    A. V. MANDEKIC    2,917,323
TRAILER HITCH
Filed May 20, 1955    2 Sheets-Sheet 2
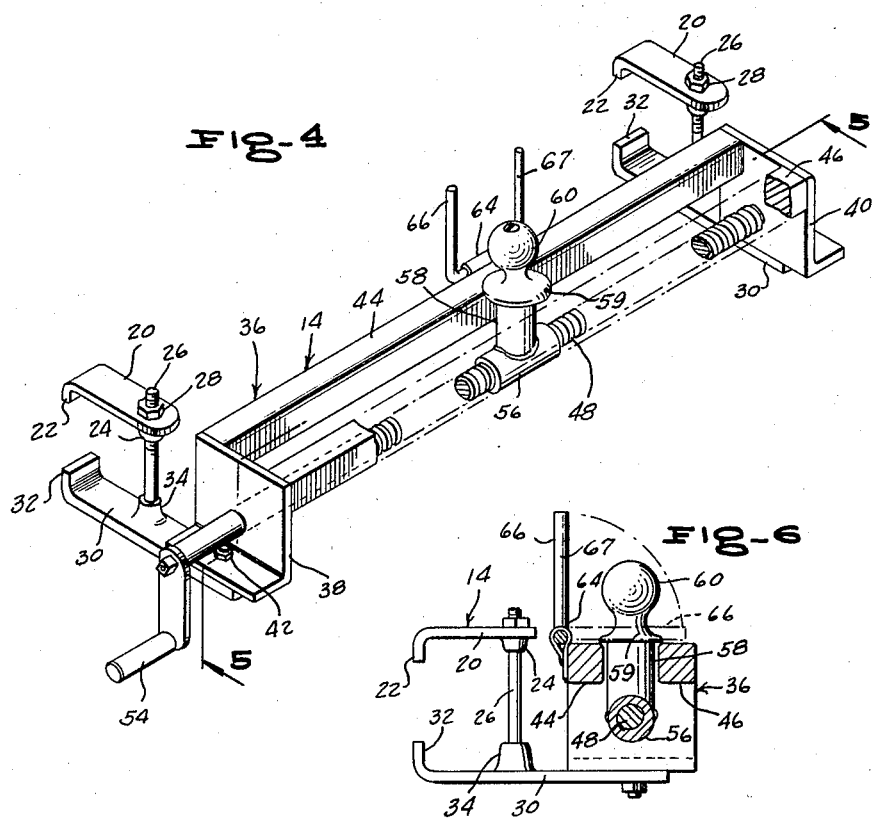
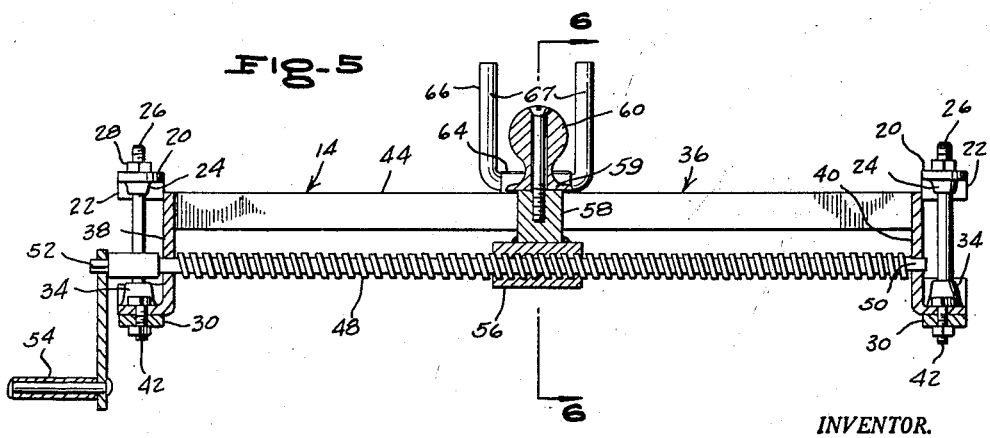
INVENTOR.
ANTHONY V. MANDEKIC
BY
McMorrow, Berman & Davidson
ATTORNEYS

2,917,323
TRAILER HITCH

Anthony V. Mandekic, Los Angeles, Calif.

Application May 20, 1955, Serial No. 509,941

1 Claim. (Cl. 280—470)

This invention relates to an improved trailer hitch of the type having a laterally adjustable coupling member.

A primary object of the invention is to provide a more efficient and practical device of the character indicated which is characterized by simplicity of construction, ruggedness, and trouble-free operation, and which can be manufactured at relatively low cost.

Another important object of the invention is to provide a device of the character indicated wherein means is provided for holding the coupling in a central position against lateral movement relative to the frame of the hitch, so as to relieve the coupling and its adjusting screw from strain that would otherwise be imposed thereon.

Other objects will appear from the following description, the claims appended thereto, and from the annexed drawings in which like reference characters designate like parts throughout the several views and wherein:

Figure 1 is a side elevational view of a hitch in accordance with the present invention, in association with a tractor and a trailer vehicle, only a portion of the tractor being shown;

Figure 2 is a top plan view of Figure 1, showing in broken lines a position to which the coupling of the hitch, and the trailer, can be shifted for the purpose of facilitating backing up thereof;

Figure 3 is an enlarged detail section on line 3—3 of Figure 2, showing the means for connecting the device to the draft vehicle;

Figure 4 is a perspective view of the hitch device per se;

Figure 5 is a longitudinal sectional view taken on line 5—5 of Figure 4; and

Figure 6 is a transverse sectional view, on an enlarged scale, taken on line 6—6 of Figure 5, showing the means for locking the coupling in its centered, normal position, the dotted lines showing said means in locking position and the full lines showing the means in a inoperative position.

The tractor vehicle 10 has a rear transverse bumper bar 18 attached thereto by means indicated at 16.

Referring in detail to the drawings, the numeral 10 generally designates a tractor vehicle, such as a passenger automobile, and the numeral 12 a trailer vehicle, such as a conventional luggage trailer, the trailer being shown connected to the tractor vehicle by a hitch 14 in accordance with the present invention.

The illustrated hitch 14 comprises a pair of spaced, vertically adjustable clamp arms 20 having downturned lips 22 on their forward ends. Integrally formed on the rear ends of the clamp jaws 20 are depending bosses 24 (Figure 3) having smooth-walled, vertically extending bores receiving the threaded upper ends of clamp bolts 26. Nuts 28 are threaded on the clamp bolts, and are turned home against the upper sides of the clamp jaws 20, to force the same downwardly against the top edge of the bumper bar 18, at locations spaced along the length of the bumper bar.

The hitch further comprises a pair of fixed lower clamp jaws 30 which terminate at their forward ends in upwardly turned lips 32 engageable with the bottom edge of the bumper bar 18. The lower clamp jaws 30 are formed with upwardly projecting bosses 34 vertically aligned with the bosses 24, and having upwardly opening, threaded sockets in which the lower ends of the clamping bolts are engaged.

The clamps defined by the jaws 20, 30 and clamp bolts 26 are parts of the frame 36 of the device, said frame being elongated transversely of the vehicle with the clamps being disposed at opposite ends of the frame. The frame includes vertically disposed, approximately square end plates 38, 40 respectively having at their lower edges outwardly directed flanges, apertured to receive mounting bolts 42 passing through registering apertures formed in the inner ends of the lower clamp jaws 30 to fixedly mount the lower clamp jaws upon the flanges.

Fixedly secured at their opposite ends to the end plates and extending between the end plates are guide bars 44, 46. These, as illustrated, may be formed from rectangularly cross-sectional lengths of solid bar stock. The guide bars are disposed in a common horizontal plane spaced above the lower jaws 30 and are secured to the upper ends of the end plates. Journaled at its ends in the end plates below and medially between the guide bars is a screw 48. At one end, the screw has a reduced, smooth-axial extension 50 journaled in a bearing opening formed in end plate 40 (Figure 5) while at its other end, the screw has a smooth axial extension 52 journaled through the end plate 38. The outer end of the extension 52 is of non-circular cross section, for engagement in a complementary opening in a hand crank 54 provided for rotating the screw whenever a follower 56, threadedly engaged with the screw, is to be shifted longitudinally of the screw.

The follower 56 comprises a sleeve threaded on the screw 48, and welded or otherwise fixedly secured to and projecting upwardly from the sleeve is a preferably cylindrical follower 58. A globular coupling element 60 is secured by a screw or equivalent fastening means to the upper end of the follower 58, and projects above the horizontal plane of the guide bars, with the follower 58 being disposed between the guide bars in closely spaced relation to the facing sides of the guide bars.

Preferably, the coupling element has a flanged base 59 slidably resting upon the top surfaces of the guide bars, as shown in Figure 6, to hold the follower 58 properly centered, under normal conditions, between the guide bars.

The trailer 12 is provided with a downwardly opening ball socket 62 on the forward extremity of the tongue of the trailer, which receives the coupling member 60, and is lockably engaged therewith to prevent accidental separation of the trailer and draft vehicles, the socket still having universal movement with respect to the coupling member. This, of course, is conventional in a trailer construction, and does not constitute part of the present invention.

Whenever it is desired to move the coupling member 60 from its normally centered position medially between the ends of the frame 36, the crank 54 is rotated so as to shift the follower 58 to the left or to the right. This locates the follower, and hence the coupling element 60, to the right of or left of the center of the frame 36 according to the needs of the particular situation, so as to position the trailer 12, for example, in the dotted line position shown in Figure 2.

Normally, of course, the trailer 12 is in its full line position of Figure 2, and in this position, is prevented from exerting lateral strains upon the follower 58, tending to damage the threaded engagement between the follower and screw 48 by a latch 61. The latch 61 comprises a sleeve 64 fixedly secured to the middle of one of the guide bars, and extends longitudinally of the guide bar. A U-shaped latch bar 66 has its bight portion rotatably mounted in the sleeve 64 with its legs 67 at the ends of the sleeve 64 and swingable between the full and dotted line positions of Figure 6 about an axis paralleling the lengths of the guide bars 44, 46. The legs 67 of the latch bar are arranged to rest upon both guide bars 44 and 46 in the lowered, locking position of the latch shown in dotted lines in Figure 6, with the legs 67 engaging opposite sides of the coupling elements 60, so as to prevent shifting of the coupling element and accidental rotation of the screw 48, and insure that the threads of the follower and of the screw will not suffer more than ordinary wear during the life of the hitch.

Of course, whenever the follower is to be shifted along the length of the screw, the locking bar is thrown upwardly to the full line position of Figure 6, and the screw turned in the manner previously described herein.

It is believed apparent that the invention is not necessarily confined to the specific use or uses thereof described above since it may be utilized for any purpose to which it may be suited. Nor is the invention to be necessarily limited to the specific construction illustrated and descirbed, since such construction is only intended to be illustrative of the principles, it being considered that the invention comprehends any minor change in construction that may be permitted within the scope of the appended claim.

What is claimed is:

In a trailer hitch, a frame comprising a pair of vertical end plates having upper and lower ends, jaw means on said end plates for securing the frame to a bumper bar, front and rear horizontal guide bars extending between and secured at their ends to said end plates, said guide bars being in the same horizontal plane and being parallel and spaced laterally from each other, a horizontal screw extending between said end plates and spaced below said guide bars, said screw having ends journaled in said end plates, means for rotating the screw in opposite directions, a sleeve threaded on said screw, a follower fixed to and rising from said sleeve between and engaged with said guide bars, and a coupling element on the upper end of the follower above the guide bars, and a U-shaped latch swingably mounted centrally upon one of said guide bars having legs engageable with opposite sides of the coupling element only while the follower is centered with respect to the frame.

References Cited in the file of this patent

UNITED STATES PATENTS

| | | |
|---|---|---|
| 1,424,631 | Edmonds | Aug. 1, 1922 |
| 1,450,526 | Timmis | Apr. 3, 1923 |
| 2,089,400 | Morris | Aug. 10, 1937 |
| 2,692,150 | Maier | Oct. 19, 1954 |